US011952050B2

(12) United States Patent
Mason et al.

(10) Patent No.: US 11,952,050 B2
(45) Date of Patent: Apr. 9, 2024

(54) APPARATUS AND KIT FOR FORD VEHICLE STEERING RACK AND PINION

(71) Applicant: BroncBuster LLC, Fischer, TX (US)

(72) Inventors: Tyler Mason, Fischer, TX (US); Austin Shuman Brackin, Preston, ID (US)

(73) Assignee: BroncBuster LLC, Fischer, TX (US)

( * ) Notice: Subject to any disclaimer, the term of this patent is extended or adjusted under 35 U.S.C. 154(b) by 0 days.

(21) Appl. No.: 18/243,041

(22) Filed: Sep. 6, 2023

(65) Prior Publication Data

US 2023/0417283 A1 Dec. 28, 2023

Related U.S. Application Data

(63) Continuation of application No. 18/213,803, filed on Jun. 23, 2023, which is a continuation-in-part of application No. 18/089,350, filed on Dec. 27, 2022.

(60) Provisional application No. 63/461,614, filed on Apr. 25, 2023, provisional application No. 63/294,065, filed on Dec. 27, 2021.

(51) Int. Cl.
B62D 3/12 (2006.01)
F16C 29/02 (2006.01)
F16C 29/10 (2006.01)
F16C 33/74 (2006.01)

(52) U.S. Cl.
CPC ............... B62D 3/12 (2013.01); F16C 29/02 (2013.01); F16C 29/10 (2013.01); F16C 33/74 (2013.01); F16C 2326/24 (2013.01)

(58) Field of Classification Search
CPC .......... F16C 29/02; F16C 29/10; F16C 33/74; F16C 2326/24; B62D 3/12
See application file for complete search history.

(56) References Cited

U.S. PATENT DOCUMENTS

| 6,457,375 | B1 | 10/2002 | Buch | |
| 7,334,660 | B2 * | 2/2008 | Damore | B62D 5/22 |
| | | | | 180/428 |
| 9,499,192 | B2 * | 11/2016 | Minami | B62D 3/12 |
| 2006/0219467 | A1 * | 10/2006 | Damore | B62D 5/22 |
| | | | | 180/428 |

(Continued)

FOREIGN PATENT DOCUMENTS

| CN | 106741129 A | * | 5/2017 | ............... B62D 3/12 |
| KR | 20220022265 A | * | 10/2020 | ............... B62D 3/12 |

Primary Examiner — Zakaria Elahmadi
(74) Attorney, Agent, or Firm — Outlier Patent Attorneys, PLLC

(57) ABSTRACT

A kit for reinforcing a rack and pinion steering system includes a bushing to be slid over an end of a steering rack and inserted into an opening of a rack housing of the rack and pinion steering assembly on the driver's side. The kit may also include a retainer to be inserted into the opening of the rack housing to ensure that the bushing remains in position inside the rack housing. The bushing includes a reinforcing side and a retaining side. The reinforcing side has a shape that mimics the shape of the space between the rack rod and the rack housing. The kit may further include an enhanced passenger side housing assembly that includes a bushing made of a wear resistant material. The passenger side bushing is disposed within a passenger side main housing. The enhanced passenger side housing assembly replaces the original passenger side housing.

19 Claims, 18 Drawing Sheets

(56) References Cited

U.S. PATENT DOCUMENTS

| | | | |
|---|---|---|---|
| 2008/0088104 A1* | 4/2008 | Arlt | F16C 29/02 |
| | | | 280/93.514 |
| 2015/0251687 A1* | 9/2015 | Minami | B62D 3/12 |
| | | | 74/422 |
| 2018/0274562 A1* | 9/2018 | Chambers | B62M 25/08 |
| 2019/0126969 A1* | 5/2019 | Scheuerell | B62D 7/16 |
| 2020/0317262 A1* | 10/2020 | Sovern | F16H 19/04 |
| 2022/0185362 A1* | 6/2022 | Kinne | B62D 3/12 |

\* cited by examiner

APPARATUS AND KIT FOR FORD VEHICLE STEERING RACK AND PINION

CROSS-REFERENCE TO RELATED APPLICATIONS

This application is a Continuation of U.S. patent application Ser. No. 18/213,803, filed on Jun. 23, 2023, which is a Continuation-In-Part of U.S. patent application Ser. No. 18/089,350, filed on Dec. 27, 2022, which claims priority to U.S. Provisional Patent Application No. 63/294,065 filed on Dec. 27, 2021, both of which are entitled "Apparatus and Kit for Ford Vehicle Steering Rack and Pinion." This application further claims priority to U.S. Provisional Patent Application No. 63/461,614 filed on Apr. 25, 2023, entitled "Apparatus and Kit for Ford Vehicle Steering Rack and Pinion."

BACKGROUND

Field of the Art

This disclosure relates to vehicular steering rack and pinion systems. More specifically, this disclosure relates to parts and kits of parts for reinforcing a steering rack.

Discussion of the State of the Art

Vehicles such as the 2021/2022 Ford Bronco® are often used in off-road scenarios. Many off-road users like to make modifications such as installing oversized tires and suspension lift. Such modifications may unintentionally interfere with systems of the original design of the vehicle.

One example relative to the present invention is that modifications to the suspension such as lift and wheels on such vehicles as the Bronco®, in combination with impacts from the rough terrain encountered during off-road operations, have been known to cause damage to the steering rack and pinion system of the vehicle. This damage causes the steering rack and pinion system to degrade to the point that the steering pinion no longer meshes with the teeth of the steering rack rod, resulting in sometimes intermittent and, in other cases, a complete and catastrophic loss of steering for the vehicle.

The manufacturer considers that the vehicle has been properly designed and tested for its intended normal operation and that it does not assume responsibility when users modify the original systems designs. As such, there is a need for a solution to prevent loss of steering for these vehicles when the vehicles have been modified.

SUMMARY

The original rack and pinion steering system can degrade and even fail when modifications desired by off-roading enthusiasts, such as suspension lift and oversized tires, are incorporated in at least some models such as the (2021/2022) Ford Bronco®, Gen 2 or Gen 3 Ford Raptor®, and/or the (2021/2022) Ford Ranger®. Loss of manual steering capability on these vehicles can be attributed to the added torques and impacts of off-roading, causing the original rack and pinion steering assembly to degrade to the point that the pinion can disengage from the teeth of the steering rack, resulting in a complete lack of steering capability.

To overcome this problem, a kit of parts can be used to reinforce the factory configuration of a vehicle. In an exemplary preferred embodiment, the kit includes one bushing (for the driver's side of the rack closest to the rack and pinion engagement point) sized to slide over the steering rack and fit snugly into the steering rack housing, and a corresponding keeper clip designed to ensure that the bushing cannot vibrate out of the rack housing.

The present invention thereby provides a bushing that is sized to reinforce the original steering rack assembly so that steering capability cannot be lost due to the steering pinion no longer engaging the teeth on the rack rod such as when a 2021/2022 Ford Bronco® or Ford Ranger® is modified with an aftermarket lift kit and/or oversized tires for off-roading. The present invention further provides an enhanced passenger side housing assembly for reinforcing the passenger side of the steering rack.

In one example, the present invention is directed to a bushing for reinforcing a rack and pinion steering system that includes a steering rack disposed within a rack housing. The bushing includes a body and an aperture. The body has a longitudinal axis, a reinforcing side, and a retaining side. The reinforcing side has a shape that substantially occupies a space between a portion of a length of the steering rack and the rack housing without impeding axial movement of the steering rack through the rack housing. The reinforcing side is located along an inner portion of the longitudinal axis. The reinforcing side of the body may be cylindrical in shape. The reinforcing side of the body may include a rounded protrusion on at least one side thereof.

The retaining side restricts movement of the body through the rack housing. The retaining side is located along an outer portion of the longitudinal axis. The reinforcing side and the retaining side of the body may be located immediately adjacent to each other. The reinforcing side and the retaining side of the body may be integral elements of the body. A crosswise dimension of the retaining side of the body, taken perpendicular to and through the longitudinal axis of the body, may exceed a crosswise dimension of the reinforcing side of the body, taken perpendicular to and through the longitudinal axis of the body. The retaining side of the body may be cylindrical in shape. A length of the reinforcing side of the body, taken along the longitudinal axis of the body, may exceed a length of the retaining side of the body, taken along the longitudinal axis of the body.

The aperture extends along the longitudinal axis of the body and has a shape that receives the portion of the length of the steering rack without impeding the axial movement of the steering rack through the rack housing. The bushing may further include an O-ring carried by an outer periphery of the retaining side of the body to seal the outer periphery of the retaining side of the body against corresponding portions of an interior of the rack housing. The bushing may also include a groove in the outer periphery of the retaining side of the body, and the groove may receive the O-ring.

In another example, the present invention is directed to an assembly for reinforcing a rack and pinion steering system that includes a steering rack disposed within a rack housing. The assembly includes a bushing having a body and an aperture. The body includes a longitudinal axis, and the aperture extends along the longitudinal axis of the body and has a shape that receives the portion of the length of the steering rack without impeding the axial movement of the steering rack through the rack housing.

The body of the bushing includes a reinforcing side with a shape that substantially occupies a space between a portion of a length of the steering rack and the rack housing without impeding axial movement of the steering rack through the rack housing. The reinforcing side is located along an inside portion of the longitudinal axis. The body of the bushing further includes a retaining side that restricts movement of the body through the rack housing. The retaining side is located along an outside portion of the longitudinal axis.

The assembly further includes a retainer that further restricts movement of the body of the bushing through the rack housing. The retainer may be positionable adjacent a wheel-side surface of the retaining side of the body, on an opposite side of the retaining side from the reinforcing side of the body. The retainer may be positionable against the wheel-side surface of the retaining side of the body. The retainer may include a snap ring that engages a groove recessed in an inside surface of the rack housing.

In yet another example, the present invention is directed to a method for reinforcing a rack and pinion steering system that includes a steering rack disposed within a rack housing. The method includes accessing an end of the rack housing; inserting a bushing into the end of the rack housing and over an end of the steering rack; and advancing the bushing into the rack housing and over the steering rack, with a reinforcing side of the bushing substantially filling a space between a portion of a length of the steering rack and a corresponding portion of a length of the rack housing, until a retaining portion of the bushing prevents further movement of the bushing into the rack housing and over the steering rack. The step of advancing the bushing may include advancing the bushing into the rack housing and over the steering rack until a retaining side of the bushing abuts a circumferential ledge within the rack housing. After advancing the bushing, the method may include a step of preventing further movement of the bushing along the length of the rack housing. Preventing further movement of the bushing along the length of the rack housing may include introducing a retainer onto the steering rack, into an interior of the housing, and against the bushing. Introducing the retainer may include introducing a snap ring onto the steering rack, into the interior of the housing, and against the bushing so that the snap ring may engage a groove recessed in the interior of the housing. The method may also include aligning the reinforcing side of the bushing with an interior of the rack housing.

Although the kit of the invention was designed specifically for the Bronco® and Ranger® vehicles, the concepts of the invention are easily modified as appropriate for other vehicle models, as should be readily apparent after reading this disclosure.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
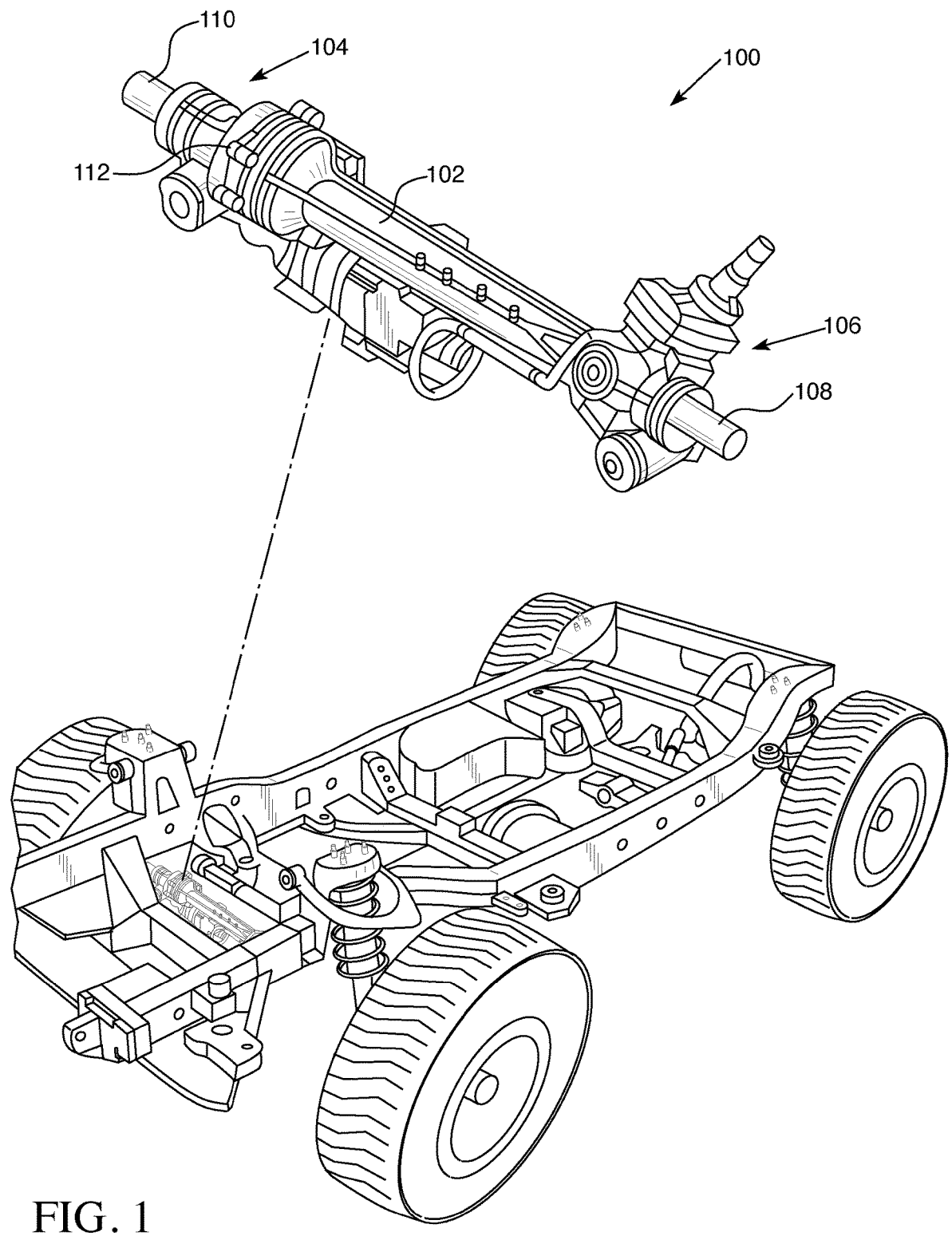
FIG. 1 illustrates schematically a rack and pinion steering system.

The present invention solves a problem that exists in steering systems of vehicles often used for off-roading, such as the Ford Bronco®. Owners of these vehicles often modify various systems on their vehicles to improve their off-road performance, including, for example, installing suspension lift and installing larger tires. Such modifications can eventually cause unintended problems or failures such as a degradation in the original steering rack that permits the steering pinion to disengage from the teeth of the steering rack, resulting in complete loss of steering of the vehicle. The present invention provides a kit of parts that can be used to modify the original factory steering system with minimal effort.

The invention is described by reference to various elements herein. It should be noted, however, that although the various elements of the inventive apparatus are described separately below, the elements need not necessarily be separate. The various embodiments may be interconnected and may be cut out of a singular block or mold. The variety of different ways of forming an inventive apparatus, in accordance with the disclosure herein, may be varied without departing from the scope of the invention.

Generally, one or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices and pails that are connected to each other need not be in continuous connection with each other, unless expressly specified otherwise. In addition, devices and parts that are connected with each other may be connected directly or indirectly through one or more connection means or intermediaries.

A description of an aspect with several components in connection with each other does not imply that all such components are required. To the contrary, a variety of optional components may be described to illustrate a wide variety of possible embodiments and in order to more fully illustrate one or more embodiments. Similarly, although process steps, method steps, or the like may be described in a sequential order, such processes and methods may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, or method is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Alternate implementations are included within the scope of various embodiments in which, for example, functions may be executed out of order from that shown or discussed, including substantially concurrently or in reverse order, depending on the functionality involved, as would be understood by those having ordinary skill in the art.

Overview

The apparatus of the present invention comprises a kit for reinforcing the original steering system of a vehicle. The kit comprises parts for reinforcing the driver's side of the steering rack and/or the passenger side of the steering rack. The parts are intended to preclude a breakdown of the original rack and pinion steering system and resultant loss of steering capability.

Apparatus

FIG. 1 illustrates the rack and pinion steering system 100 of a vehicle. The system 100 includes a rack housing 102 having a passenger side 104 and a driver's side 106. FIG. 1 depicts the driver's side portion of the steering rack 108 and the passenger side of the steering rack 110 protruding out of either end of the housing 102. The passenger side 104 includes a passenger side housing 112 in which a steering belt and ball socket are disposed.

The original parts within the rack housing 102 are configured to maintain engagement between the rack and pinion in vehicles that have not been modified. The loss of steering control in vehicles with modifications such as suspension lift and larger wheels is due to parts within the rack housing (e.g., a retainer piece) being unable to withstand larger torques due to such modifications and impacts during off-road operations. When these parts within the rack housing get damaged, the steering pinion no longer remains meshed with the teeth of the steering rack, resulting in intermittent or complete loss of steering capability.

Figure 2:
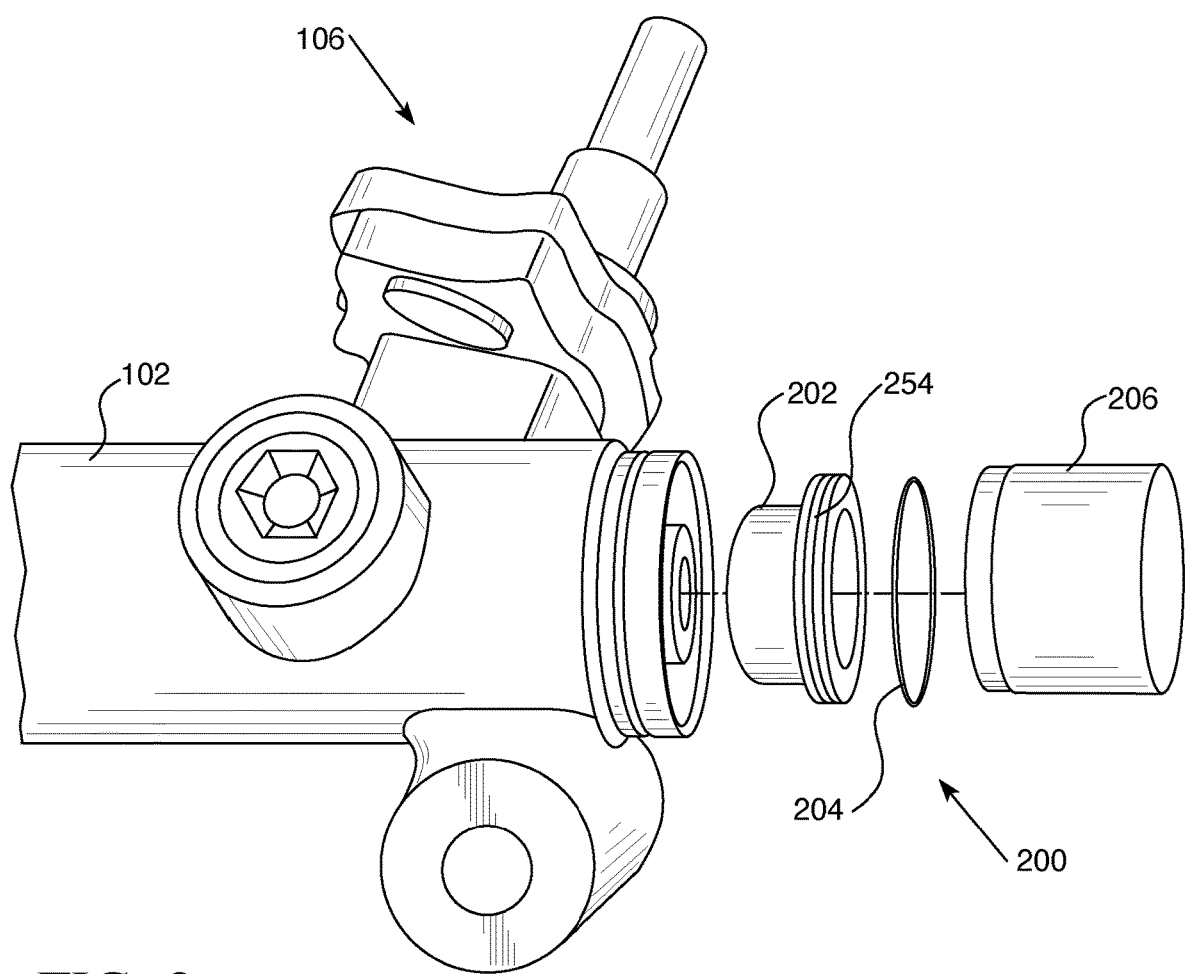
FIG. 2 is an exploded view of the components of the kit of parts for modifying the driver's side of the rack and pinion steering system, in accordance with one embodiment of the present invention.

FIG. 2 depicts the driver's side 106 of the rack housing 102 and the components of a kit 200 of parts of an exemplary embodiment of the invention. A bushing 202 is provided in this kit 200 for the driver's side rack rod of the steering assembly. The kit 200 further includes a retainer element 204 that will be used to further ensure that the bushing 202 remains in position when installed in the steering assembly. The kit 200 may further include an installation driver 206 to assist with installing the bushing 202 and the retainer element 204.

The bushing 202 will be described in greater detail with reference to FIGS. 3-6. The bushing 202 has a body 212 and an aperture 214 that extends through the body 212. The aperture 214 is sized and shaped so that a portion of the length of the steering rack 108 can be received therein without impeding axial movement of the steering rack 108 through the rack housing 102. The inner diameter 210 of the aperture 214 is constant and is slightly larger than the outer diameter of the steering rack 108. The tolerance between the inner diameter 210 of the bushing 202 and the outer diameter of the steering rack 108 is 0.01 inches or less. Thus, the inner diameter 210 of the bushing 202 is approximately equal to the outer diameter of the steering rack 108.

The body 212 of the bushing 202 has a longitudinal axis 216, a reinforcing side 218, and a retaining side 220. The reinforcing side 218 is located along an inner portion of the longitudinal axis 216 and the retaining side 220 is located along an outer portion of the longitudinal axis 216. In other words, when the bushing 202 is installed in the rack housing 102, the reinforcing side 218 is positioned in an inner portion of the rack housing 102, while the retaining side 220 is positioned in an outer portion (wheel side) of the rack housing 102. The reinforcing side 218 and the retaining side 220 are located immediately adjacent to each other and are preferably formed as a unitary or integral piece. When the hushing 202 is installed, the retaining side 220 restricts movement of the body 212 of the bushing 202 through the rack housing 102. In particular, the retaining side 220 prevents the bushing 202 from moving outward relative to the rack housing 102.

The length 222 of the reinforcing side 218 is greater than the length 224 of the retaining side 220 of the bushing 202. However, it will be readily understood by a person of ordinary skill in the art that the lengths 222, 224 may be adjusted depending on the size and shape of the rack housing and the steering rack. For instance, in other examples, the length 224 of the retaining side 220 may be greater than the length 222 of the reinforcing side 218, or the lengths 222, 224 may be equal to each other.

The reinforcing side 218 has a crosswise dimension 226 that goes through the longitudinal axis 216 and is perpendicular to the longitudinal axis 216. Similarly, the retaining side 220 has a crosswise dimension 228 (see FIGS. 5 and 6) that goes through the longitudinal axis 216 and is perpendicular to the longitudinal axis 216. The crosswise dimension 226 of the reinforcing side 218 is smaller than the crosswise dimension 228 of the retaining side 220. That is, the retaining side 220 has a greater diameter 228 than the reinforcing side 218. While the retaining side 220 has a circular cross-sectional shape, the cross-sectional shape of the reinforcing side 218 is irregular, as discussed in greater detail below.

When the bushing 202 is installed, the retaining side 220 restricts movement of the body 212 of the bushing 202 through the rack housing 102. The retaining side 220 is sized and shaped to fit snugly within the rack housing 102 and retain the bushing 202 in its desired location. The retaining side 220 has a cylindrical shape, a circular outer circumference, and a circular inner circumference. The reinforcing side 218 has a generally cylindrical shape with a lobe 242, or rounded protrusion, on one side. The lobe 242 occupies less than 40% of the outer circumference of the reinforcing side 218.

Figure 7:
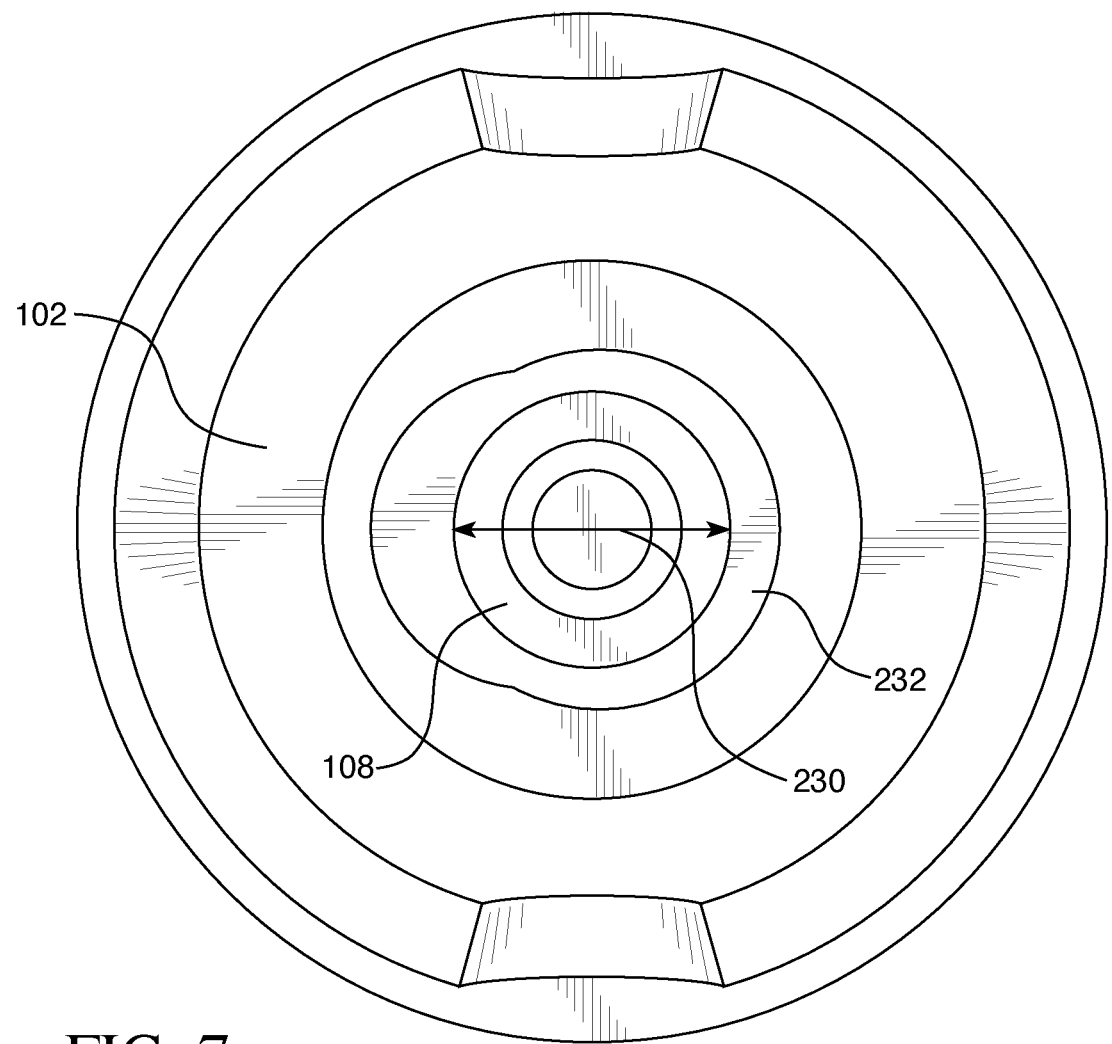
FIG. 7 is a plan view of a steering rack and rack housing that can be reinforced using the kit of parts for modifying the driver's side of the rack and pinion steering system, in accordance with one embodiment of the present invention.

The reinforcing side 218 of the bushing 202 functions to reinforce the space 232 between the outside of the steering rack 108 and the inside of the rack housing 102, as shown in FIG. 7. Thus, the bushing 202 holds the steering rack 108 in a stable lateral position relative to the rack housing 102, while allowing unimpeded axial movement of the steering rack 108 relative to the rack housing 102. The reinforcing side 218 occupies substantially all of the space 232 without interfering with axial movement of the steering rack 108 through the rack housing 102. As such, the size and shape of the reinforcing side 218 of the bushing 202 mimics the size and shape of the space 232. The inner diameter 210 of the bushing 202 is slightly larger than the outer diameter 230 of the steering rack 108, and the outer diameter of the bushing 202 is slightly smaller than the inner diameter of the rack housing 102. One of ordinary skill in the art would recognize that the present invention is not limited to the reinforcing side 218 having the shape depicted in FIGS. 3-6. For example, if the size or shape of the space 232 changes (e.g., in other vehicle makes, models, or years), the size or shape of the reinforcing side 218 of the bushing 202 would have to be adjusted accordingly to fit within the space 232.

Figure 3:
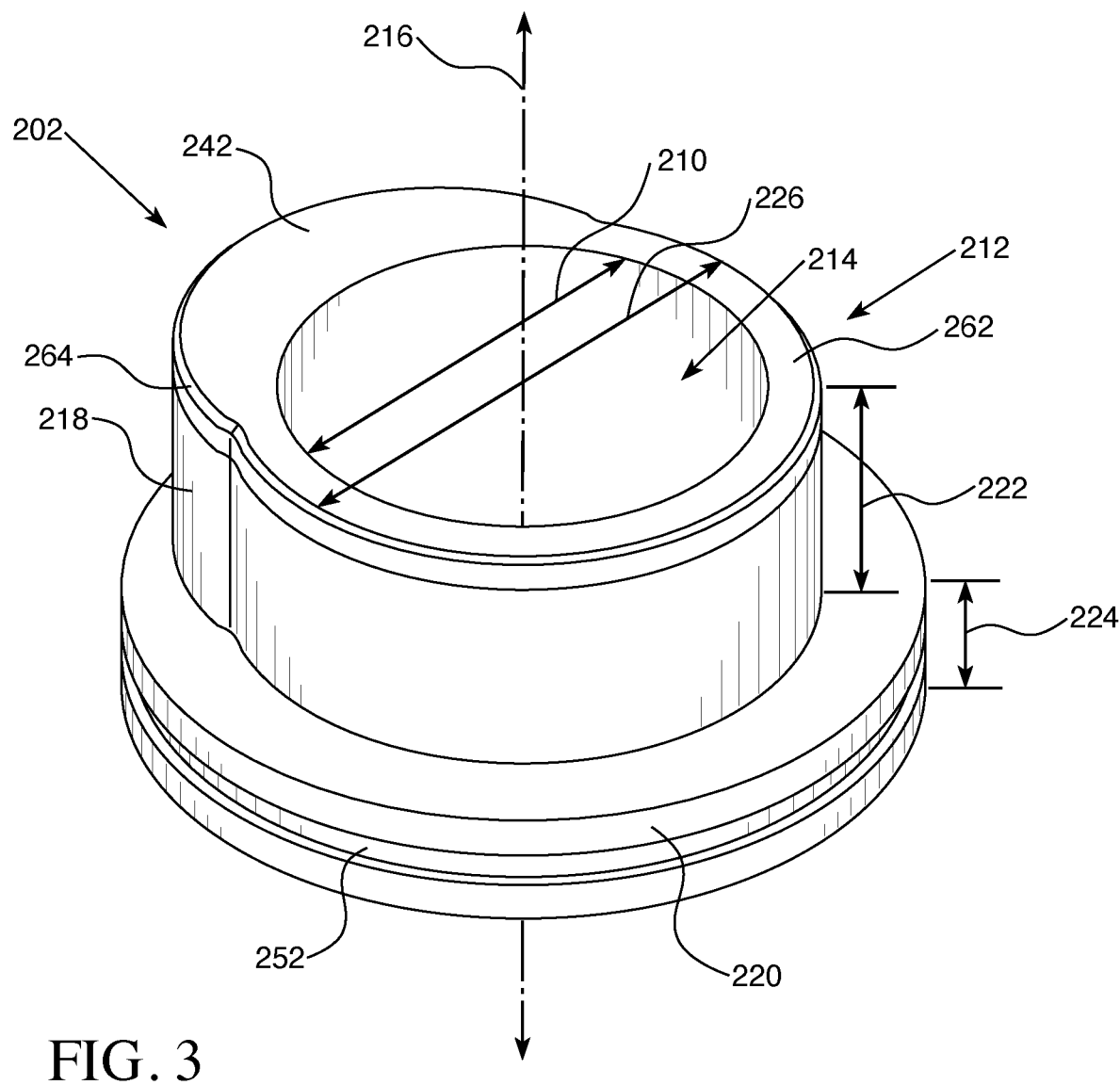
FIG. 3 is a perspective view of a bushing component of a kit of parts for modifying the driver's side of the rack and pinion steering system, in accordance with one embodiment of the present invention.
Figure 4:
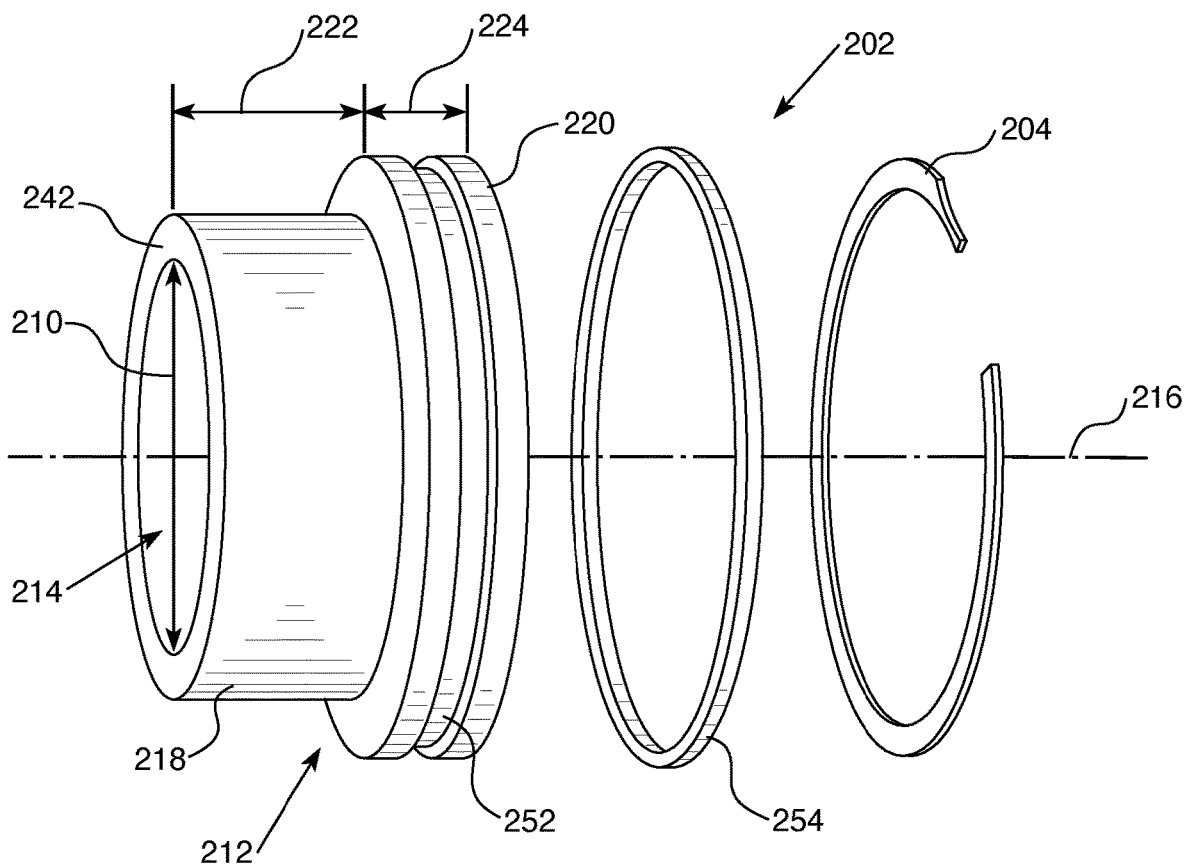
FIG. 4 is an exploded side view of a bushing and a retainer that are components in a kit of parts for modifying the driver's side of the rack and pinion steering system, in accordance with one embodiment of the present invention.
Figure 5:
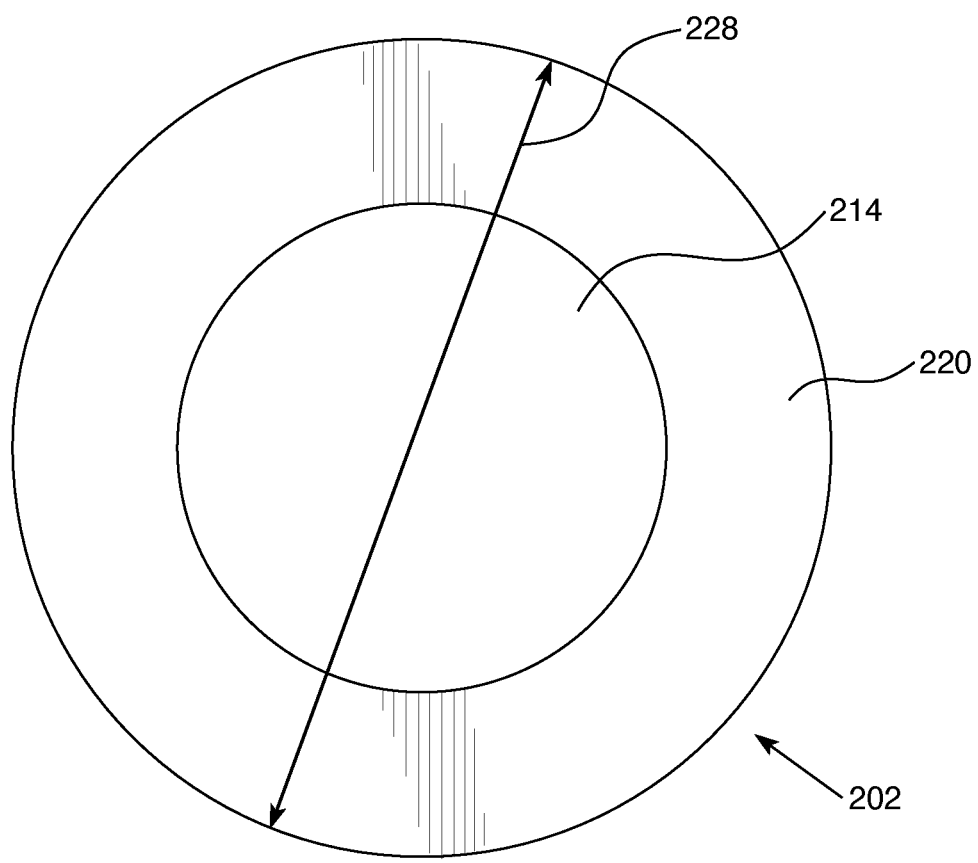
FIG. 5 is a top plan view of a retainer side of a bushing component of a kit of parts for modifying the driver's side of the rack and pinion steering system, in accordance with one embodiment of the present invention.
Figure 6:
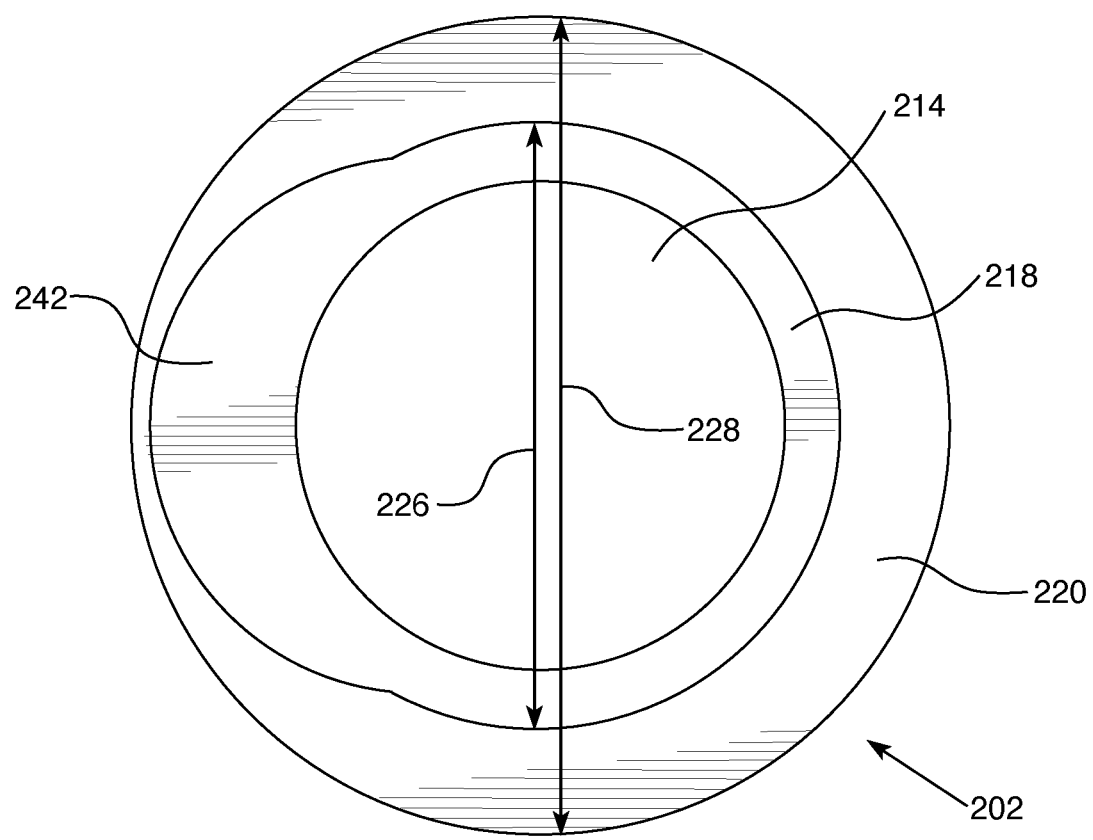
FIG. 6 is a bottom plan view of a reinforcing side of a bushing component of a kit of parts for modifying the driver's side of the rack and pinion steering system, in accordance with one embodiment of the present invention.
Figure 8:
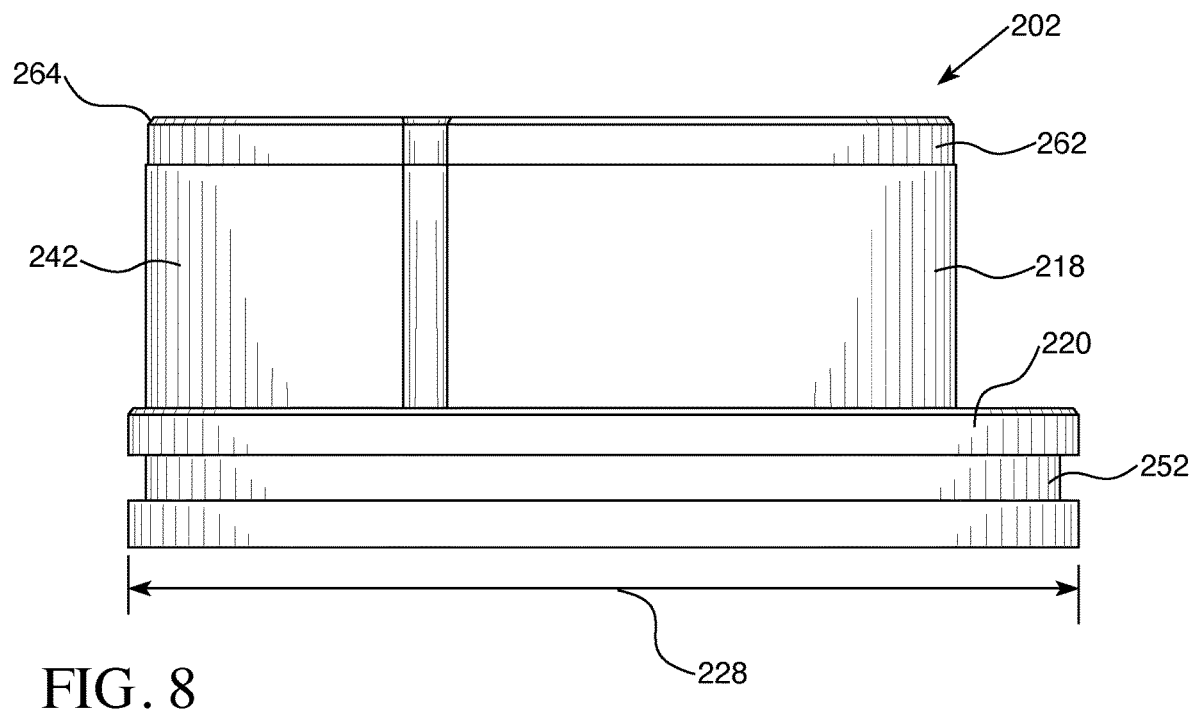
FIG. 8 is a side elevation view of a bushing component of a kit of parts for modifying the driver's side of the rack and pinion steering system, in accordance with one embodiment of the present invention.
Figure 9:
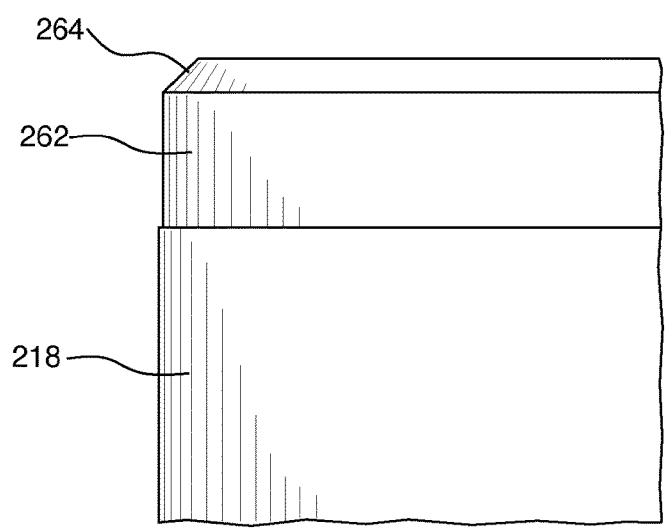
FIG. 9 is a close up view of a portion of a bushing component of a kit of parts for modifying the driver's side of the rack and pinion steering system, in accordance with one embodiment of the present invention.

The reinforcing side 218 may include a distal end portion 262 having a slightly smaller outer diameter and/or rounded or chamfered edges 264, as shown in FIGS. 3, 8, and 9. The smaller outer diameter and/or chamfered edges 264 facilitate installation of the bushing 202 into the rack housing 102. Specifically, the reduced outer diameter and/or the chamfered edges 264 help to guide the distal end 262 into position in the space 232 (shown in FIG. 7) in the rack housing 102. Alignment between the distal end 262 and the space 232 into which the reinforcing side 218 is installed is facilitated with the reduced diameter and chamfered edges 264.

The retaining side 220 of the bushing 202 includes a circumferential groove 252 that is sized and shaped for accommodating an o-ring 254 around the outer perimeter of the retaining side 220. The o-ring 254 frictionally engages the inner surface of the rack housing 102 and helps to keep the bushing 202 in place within the rack housing 102. The o-ring 254 seals the outer periphery of the retaining side 220 against corresponding portions of the interior of the rack housing 102.

The bushing 202 is the key component of this kit 200, In preferred embodiments, the bushing 202 is made of a strong, rigid, wear resistant material. For example, the bushing 202 may be made of metal, wear resistant plastic, or the like, or combinations thereof. In another example, the bushing 202 may be made of oil impregnated bronze, hardened steel, or thermoplastic. In a still further example, the bushing 202 may be made of an acetal homopolymer resin, such as Delrin®.

Figure 10A:
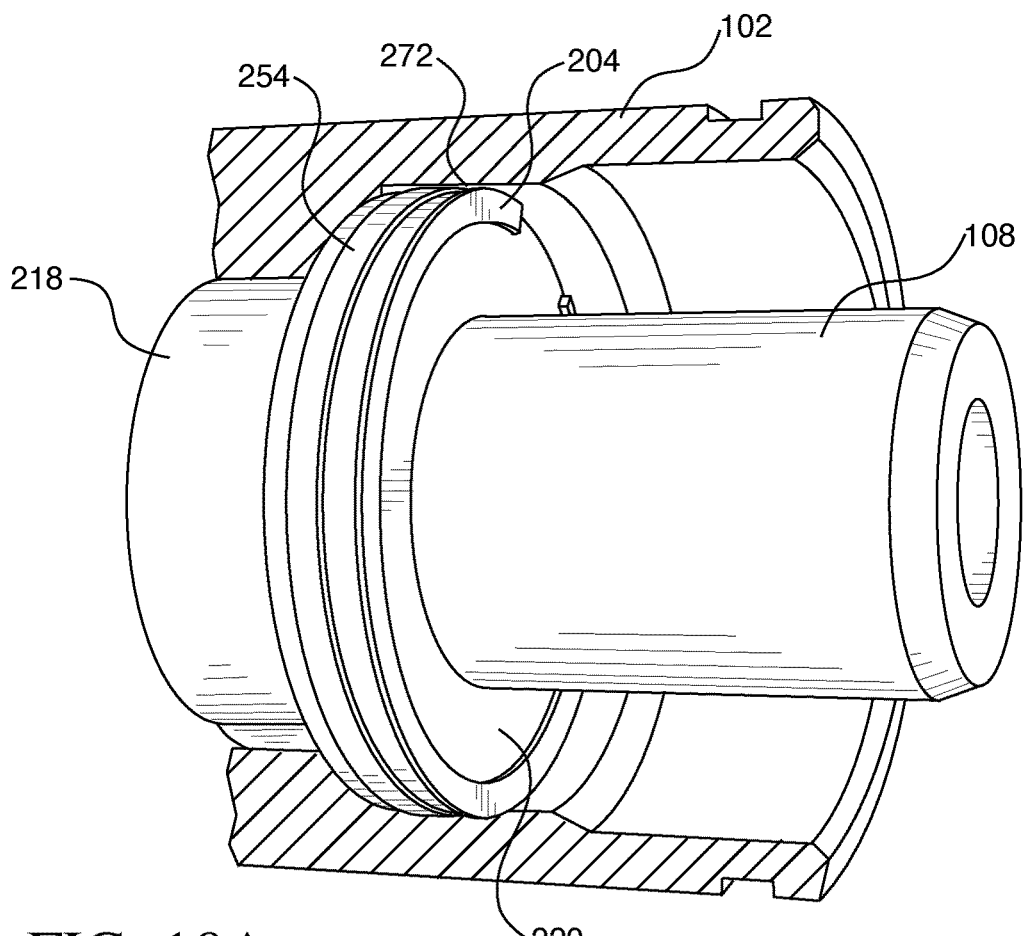
FIGS. 10A and 10B illustrate a bushing and retainer installed in the driver's side of a rack housing of the rack and pinion steering system, in accordance with one embodiment of the present invention.
Figure 10B:
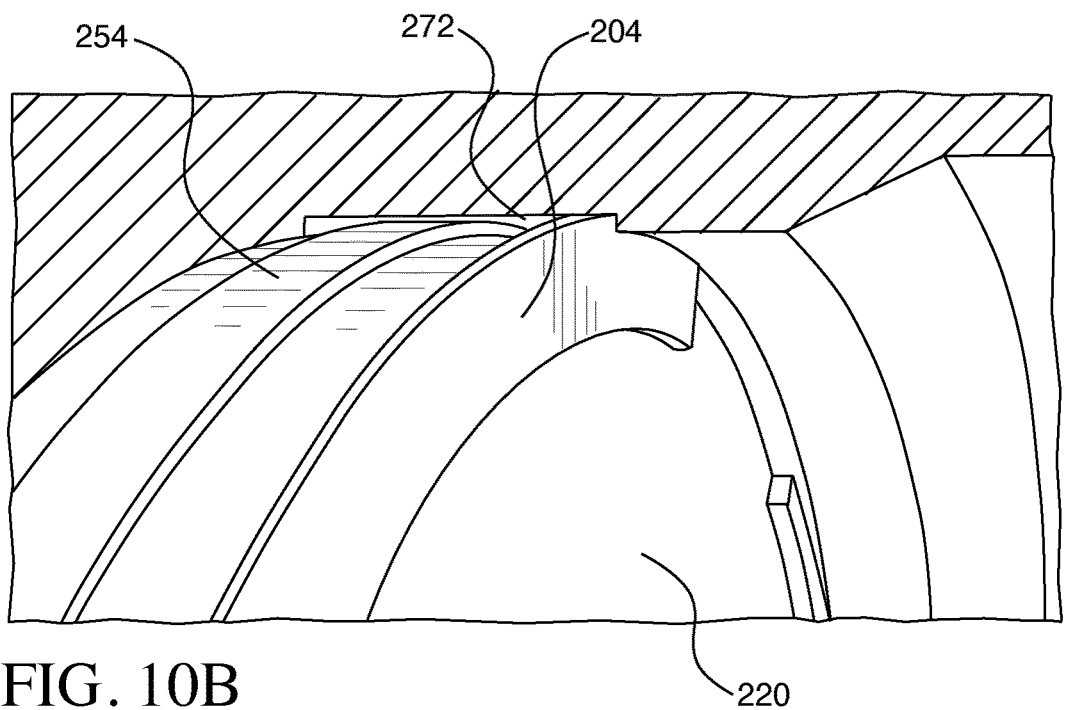

To further help with keeping the bushing 202 in place within the rack housing, the kit further includes a retainer 204 for restricting movement of the body of the bushing 202 through the rack housing 102. The retainer 204 may be made of metal having high tensile strength that is configured to compress and then snap into place within the rack housing 102. As shown in FIGS. 10A and 10B, the retainer 204 is installed adjacent to a wheelside surface of the retaining side 220 of the body 212, on an opposite side of the retaining side 220 from the reinforcing side 218 of the body 212. The rack housing 102 may include a recessed groove 272 on an inside surface thereof, and the retainer 204 may be a snap ring that engages the groove 272 recessed inside of the rack housing 102.

Although the retainer 204 is depicted as being a snap ring, it will be readily appreciated by one of ordinary skill in the art that other mechanisms may be used to retain the bushing 202 in place. For example, the retainer 204 may additionally or alternatively include a liquid sealant (such as Loctite®), retaining compound, o-ring, or the like. Additionally or alternatively, the o-ring 254 around the retaining side 220 of the bushing 202 may function as a retainer. As such, in some examples, the interference fit between the o-ring 254 and the inner surface of the rack housing 102 is sufficient for retaining the bushing 202 in place, thus eliminating the need for an additional retainer 204.

Referring back to FIG. 2, the kit 200 may further include an installation driver 206 to facilitate installing the bushing 202 and the retainer 204 in the rack housing 102. The installation driver 206 is not installed in the steering system and is simply used to help with installing the other kit parts. The distal end of the installation driver 206 may be positioned directly adjacent to the proximal end of the bushing 202 and/or the retainer 204. With the installation driver 206 thus positioned, the proximal end of the installation driver 206 may be struck with a hammer or mallet in order to force the bushing 202 and/or the retainer 204 into their desired positions.

Figure 11:
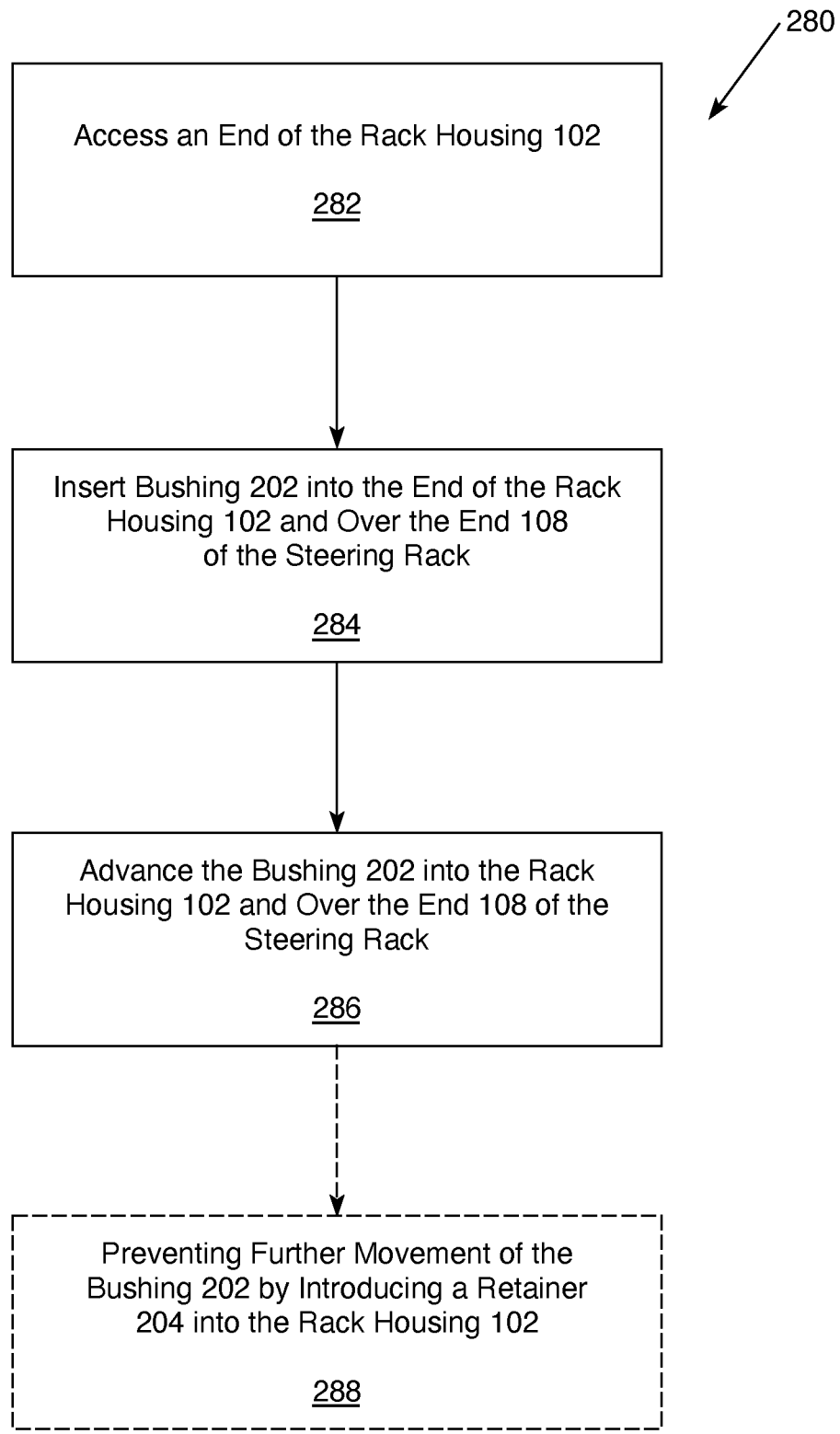
FIG. 11 is a flow chart illustrating a method for installing parts for modifying the driver's side of the rack and pinion steering system, in accordance with one embodiment of the present invention.

A method 280 for reinforcing the rack and pinion steering system is shown in FIG. 11. The rack and pinion steering system includes a steering rack disposed within a rack housing 102 (see FIG. 1). The method 280 starts with a step 282 of accessing an end of the rack housing 102 to expose the driver's side end 108 of the steering rack. Next, in step 284, a bushing 202 is inserted into the end of the rack housing 102 and over the end 108 of the steering rack. Finally, in step 286, the bushing 202 is advanced into the rack housing 102 and over the steering rack. The reinforcing side 218 of the bushing 202 substantially fills the space 232 between the end 108 of the steering rack and a corresponding portion of a length of the rack housing 102. The bushing 202 is advanced until the retaining portion 220 of the bushing 202 prevents further movement of the bushing 202 into the rack housing 102 and over the steering rack. The bushing 202 is advanced into the rack housing 102 and over the steering rack until the retaining side 220 of the bushing 202 abuts a circumferential ledge within the rack housing 102. As shown in FIGS. 10A and 10B, the recessed groove 272 forms the circumferential ledge. At the beginning of the advancing step 286, the reinforcing side 218 of the bushing 202 is aligned with an interior of the rack housing 102.

Optionally, the method 280 may include a step 288 of preventing further movement of the bushing 202 along the length of the rack housing 102 after advancing the bushing 202. Step 288 is accomplished by, for example, introducing the retainer 204 onto the steering rack, into an interior of the housing 102, and against the bushing 202. The retainer 204 may be a snap ring and the snap ring may engage a groove 272 recessed in the interior of the rack housing 102. Step 288 is optional because the o-ring 254 may be sufficient for retaining the bushing 202 in its desired position, thus eliminating the need to install a separate retainer.

The reinforcement for the passenger side of the steering rack 110 includes a passenger side housing assembly that includes a main housing, a bushing, and a retainer for holding the bushing in place within the main housing. The bushing can withstand friction from the ball screw of the steering rack as it moves axially relative to the passenger side housing assembly. The passenger side housing assembly replaces the original passenger side housing.

Figure 12:
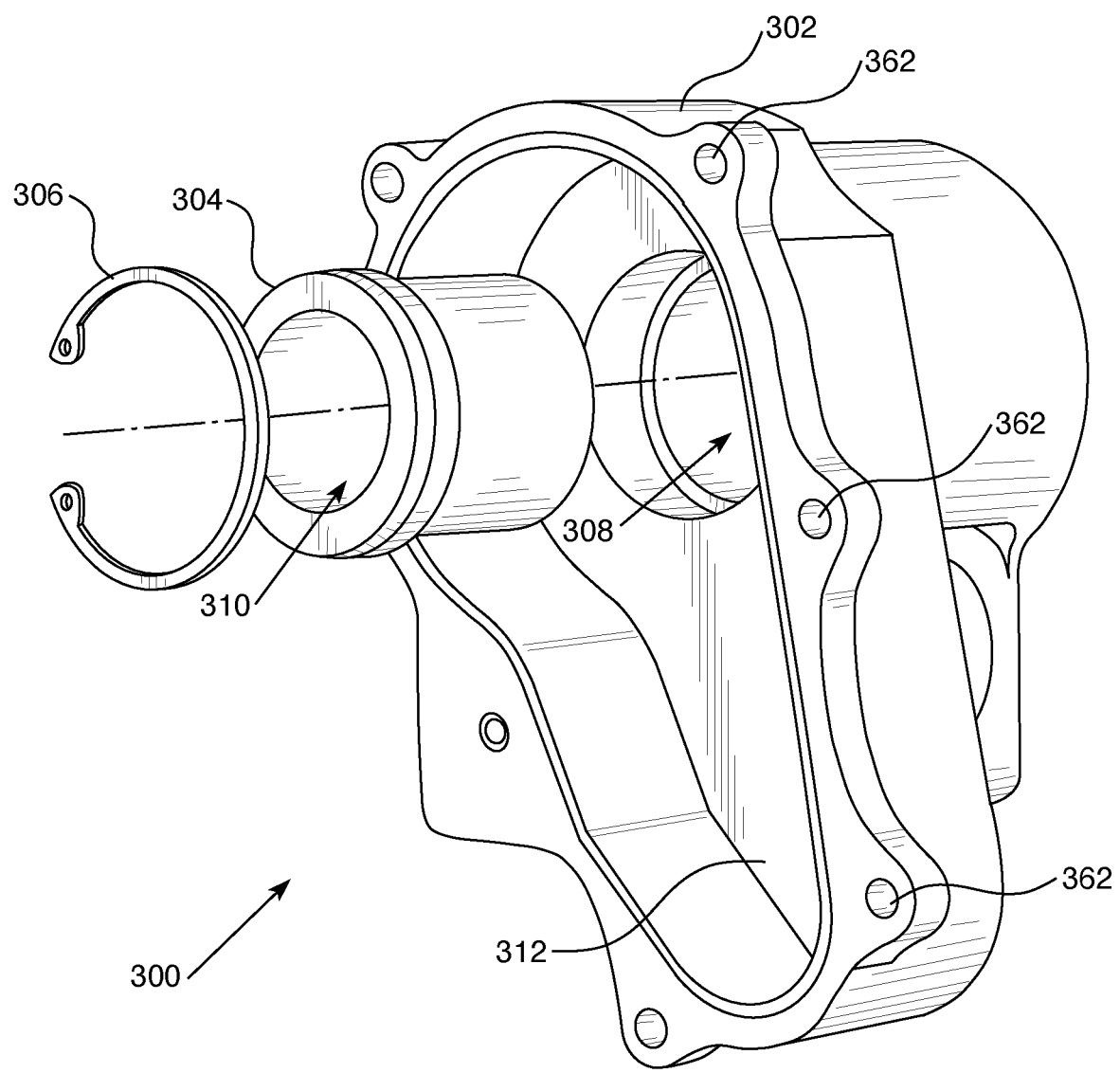
FIG. 12 is a perspective view of a passenger side housing assembly for modifying the passenger's side of the rack and pinion steering system, in accordance with one embodiment of the present invention.
Figure 13:
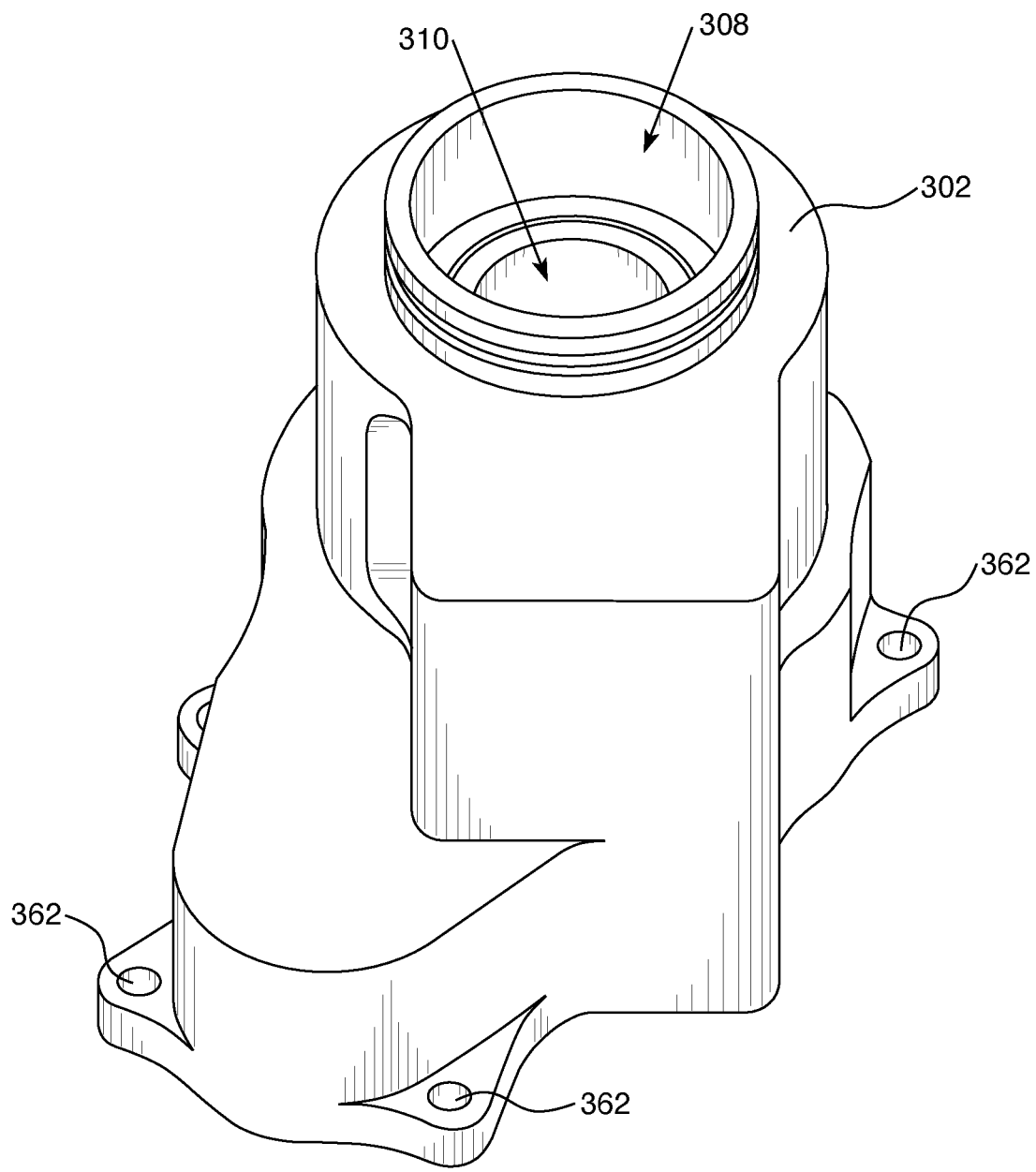
FIG. 13 is a top perspective view of a passenger side housing assembly for modifying the passenger's side of the rack and pinion steering system, in accordance with one embodiment of the present invention.
Figure 14:
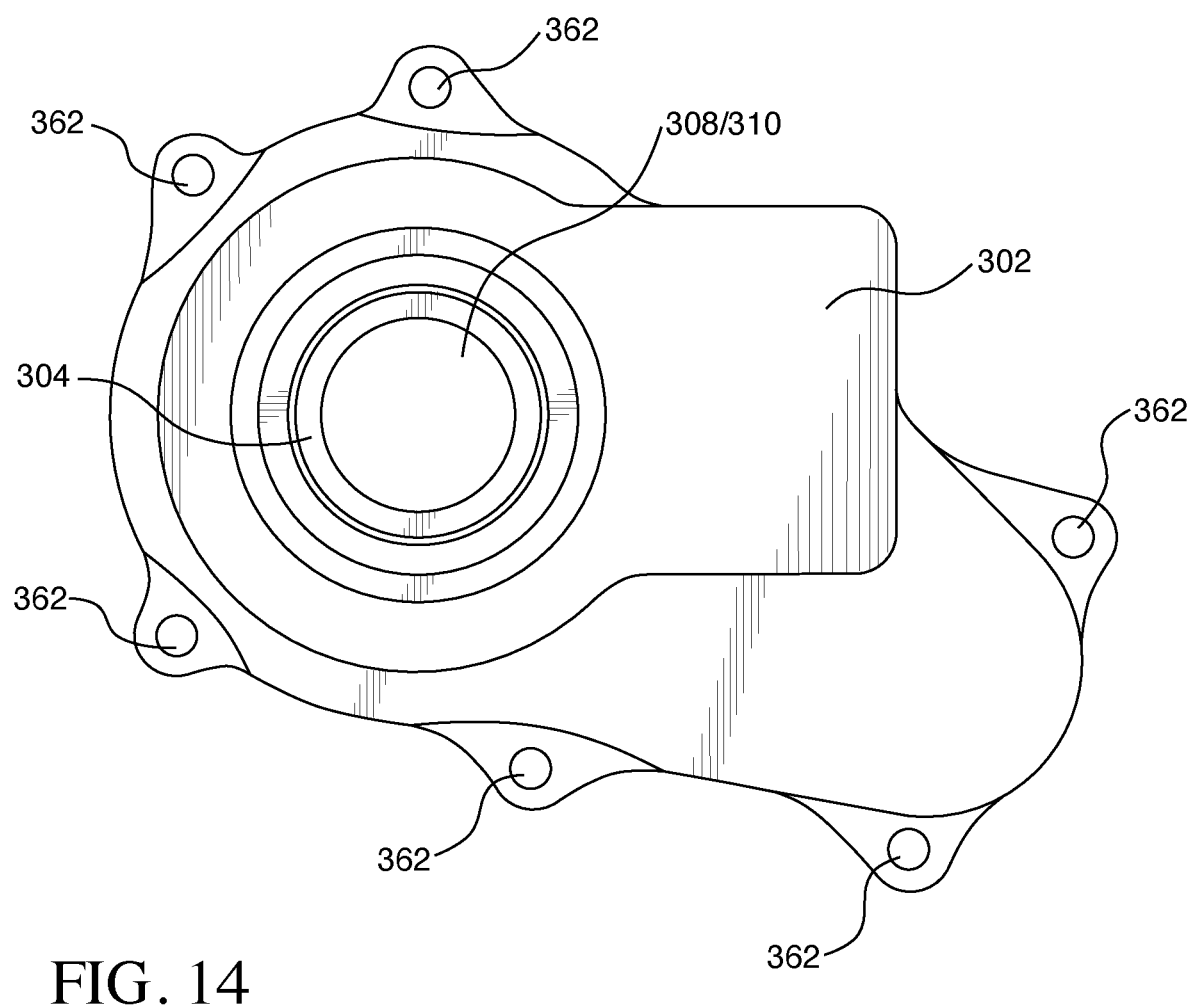
FIG. 14 is a top plan view of a passenger side housing assembly for modifying the passenger's side of the rack and pinion steering system, in accordance with one embodiment of the present invention.
Figure 15:
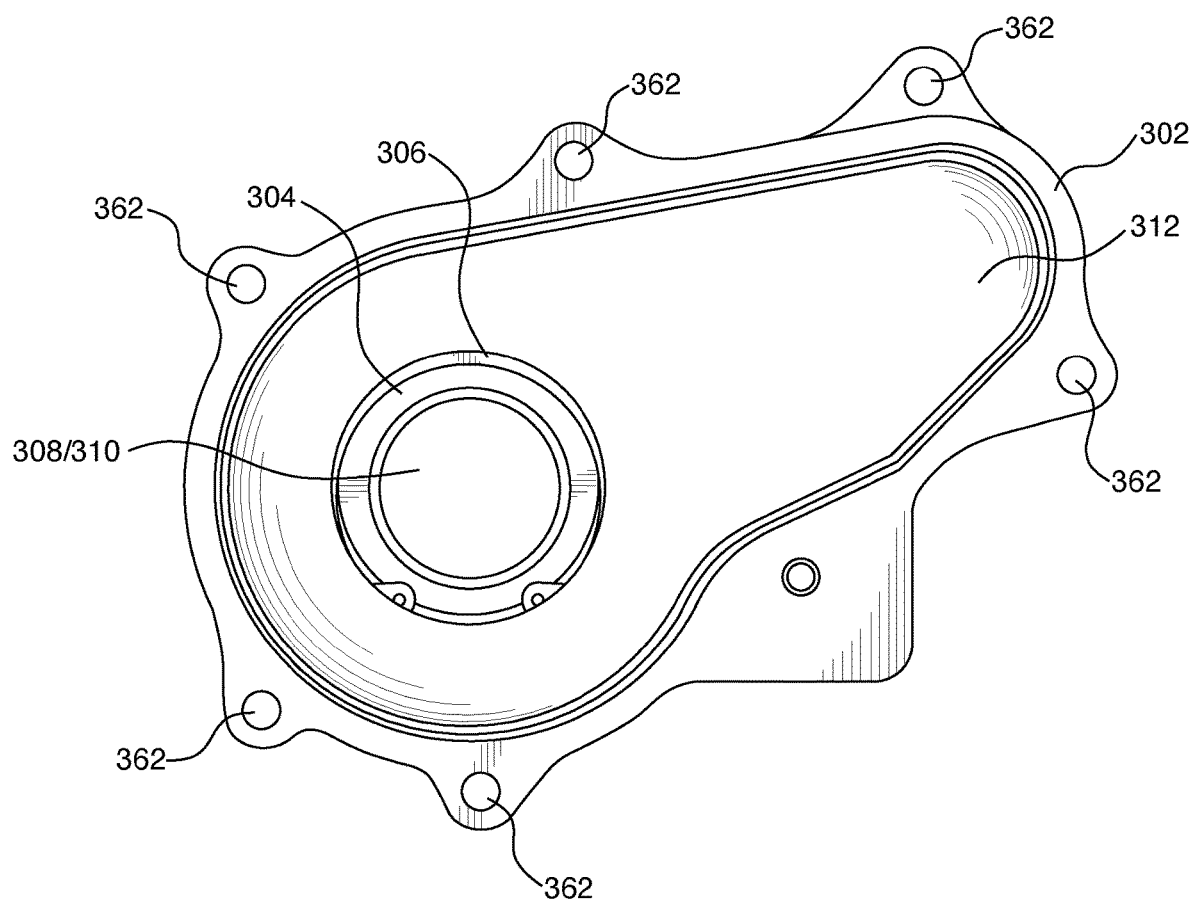
FIG. 15 is a bottom plan view of a passenger side housing assembly for modifying the passenger's side of the rack and pinion steering system, in accordance with one embodiment of the present invention.

The enhanced passenger side housing assembly 300 is depicted in FIGS. 12-18. As shown in FIG. 12, the assembly 300 includes a passenger side main housing 302, a bushing 304, and a retainer 306. The main housing 302 includes a central opening 308 extending therethrough. The retainer 306 holds the bushing 304 in place in the central opening 308. When the passenger side housing assembly 300 is installed, the passenger side steering rack 110 extends through an opening 310 in the bushing 304, and is configured to move axially through the main housing 302. As such, the bushing 304 is made of a wear resistant material that is able to withstand the force of the steering rack moving relative thereto. For example, the bushing 304 may be made of hardened steel, oil impregnated bronze, wear resistant plastic, or the like, or a combination thereof.

The main housing 302 includes a chamber 312 for housing a power steering belt and ball socket. The main housing 302 further includes a sidewall 314 (shown in FIG. 17) surrounding the central opening 308. The bushing 304 is positioned within the central opening 308. In the example shown in FIGS. 12-17, the bushing 304 is held in place within the main housing 302 with the retainer 306. Although the retainer 306 is depicted as a snap ring, it will be readily appreciated by one of ordinary skill in the art that the bushing 304 may be held in place in the main housing 302 with other retaining mechanisms, such as a liquid sealant (such as Loctite®), a retaining compound, an o-ring, or the like, or any combination thereof.

The main housing 302 may be made of billet aluminum, which is much stronger and more durable than the cast aluminum material of the original passenger side housing. However, the invention is not limited to a billet aluminum housing and other similarly durable materials may be used to make the main housing 302.

Figure 16:
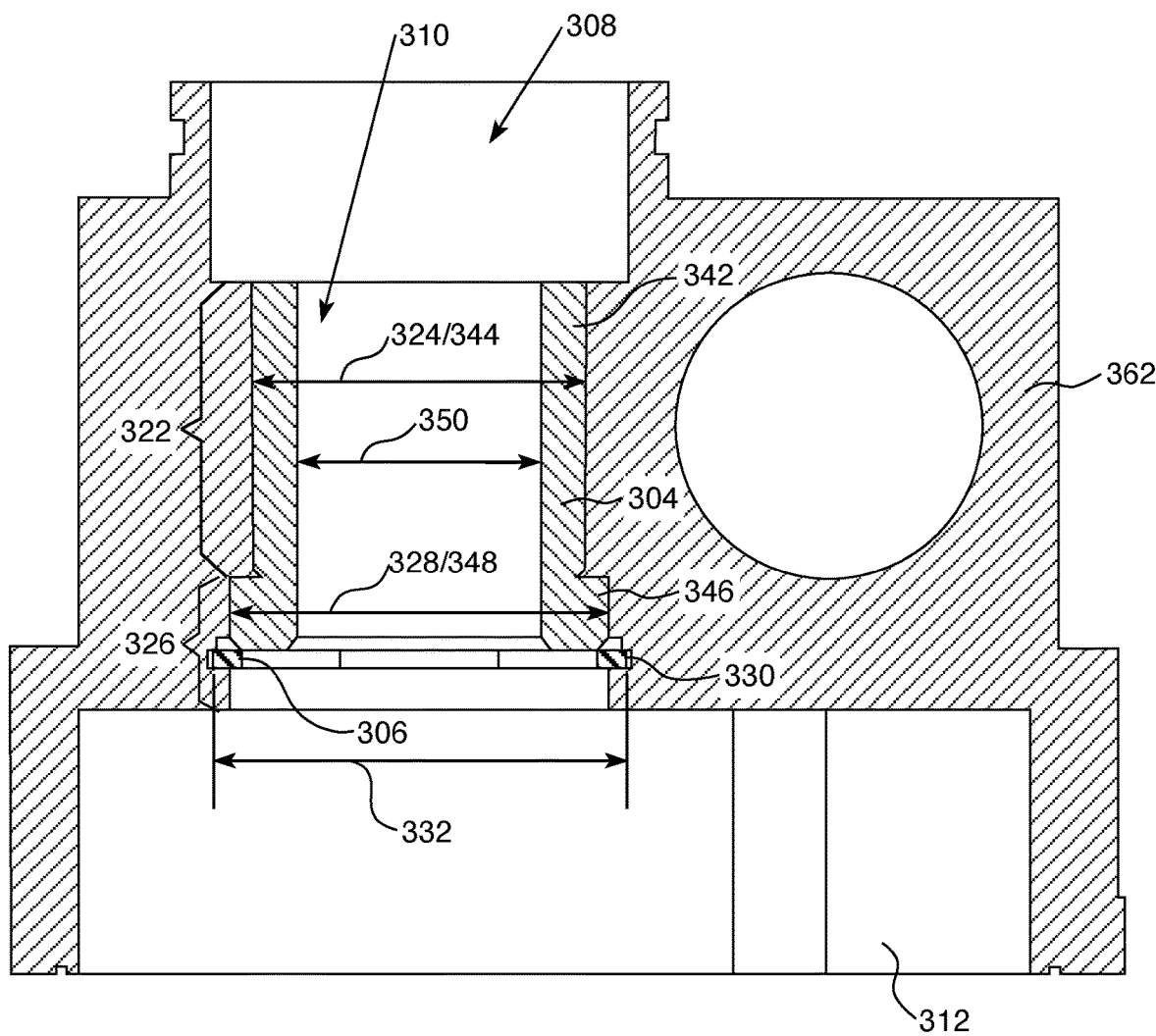
FIG. 16 is a cross-sectional view of a passenger side housing assembly for modifying the passenger's side of the rack and pinion steering system, in accordance with one embodiment of the present invention.
Figure 17:
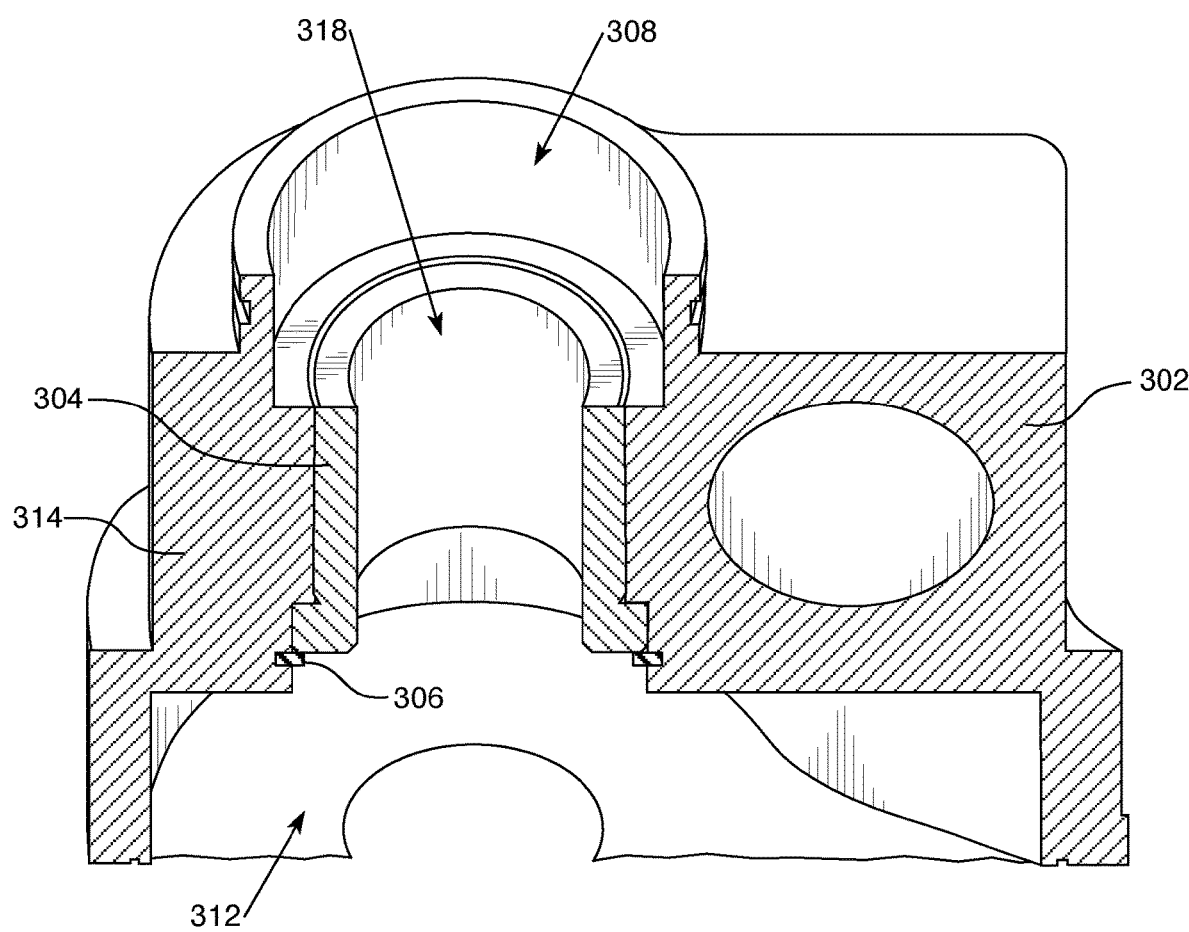
FIG. 17 is a perspective cross-sectional view of a passenger side housing assembly for modifying the passenger's side of the rack and pinion steering system, in accordance with one embodiment of the present invention.

As shown in FIG. 16, the central opening 308 in the main housing 302 includes a first portion 322 having a first inner diameter 324 that is larger than the outer diameter of the passenger side shaft. The central opening 308 further includes a second portion 326 having a second inner diameter 328 that is larger than the first inner diameter 324. The second portion 326 of the central opening 308 further includes a groove 330 having a third inner diameter 332 that is larger than the second inner diameter 328. The groove 330 is sized and shaped to accommodate the retainer 306 therein.

The shape of the bushing 304 mimics the shape of the first and second portions 322, 326 of the central opening 308 in the main housing 302. A first portion 342 of the bushing 304 is positioned in the first portion 322 of the central opening 308 of the main housing 302. The first portion 342 of the bushing 304 has an outer diameter 344 that is approximately equal to the first inner diameter 324 of the central opening 308. The bushing 304 includes a second portion 346 that is positioned within the second portion 326 of the central opening 308 of the main housing 302. The second portion 346 of the bushing 304 has an outer diameter 348 larger than the outer diameter 344 of the first portion 342 and approximately equal to the second inner diameter 328 of the central opening 308. The bushing 304 further includes a through hole 310 that has a constant inner diameter 350. The inner diameter 350 of the through hole 310 is approximately equal to the outer diameter of the passenger side shaft. As such, the passenger side shaft is able to move axially through the main housing 302 without interference.

The passenger side housing assembly 300 further includes a retainer 306 for holding the bushing 304 in place relative to the main housing 302. The retainer 306 may be a keeper clip, as illustrated in FIGS. 12 and 15-17. Additionally or alternatively, the retainer 306 may include a liquid sealant (such as Loctite®), a retaining compound, an o-ring, or the like, or any combination thereof. In this example. As shown in FIG. 16, the retainer 306 fits within a groove 330 in the second portion 326 of the central opening 308 of the main housing 302.

The housing assembly 300 further includes a plurality of fastener elements 362 around an outer periphery of the main housing 302. The fastener elements 362 facilitate connection between the main housing 302 and the steering rack housing.

The configuration of the main housing and the bushing depicted in FIGS. 12-17 is only one example of possible configurations that may be used to reinforce the passenger side of the steering system. Other configurations are within the scope of this invention. For example, the bushing 304 may be completely cylindrical and may be held in place within the main housing using a retaining compound or permanent adhesive.

Figure 18:
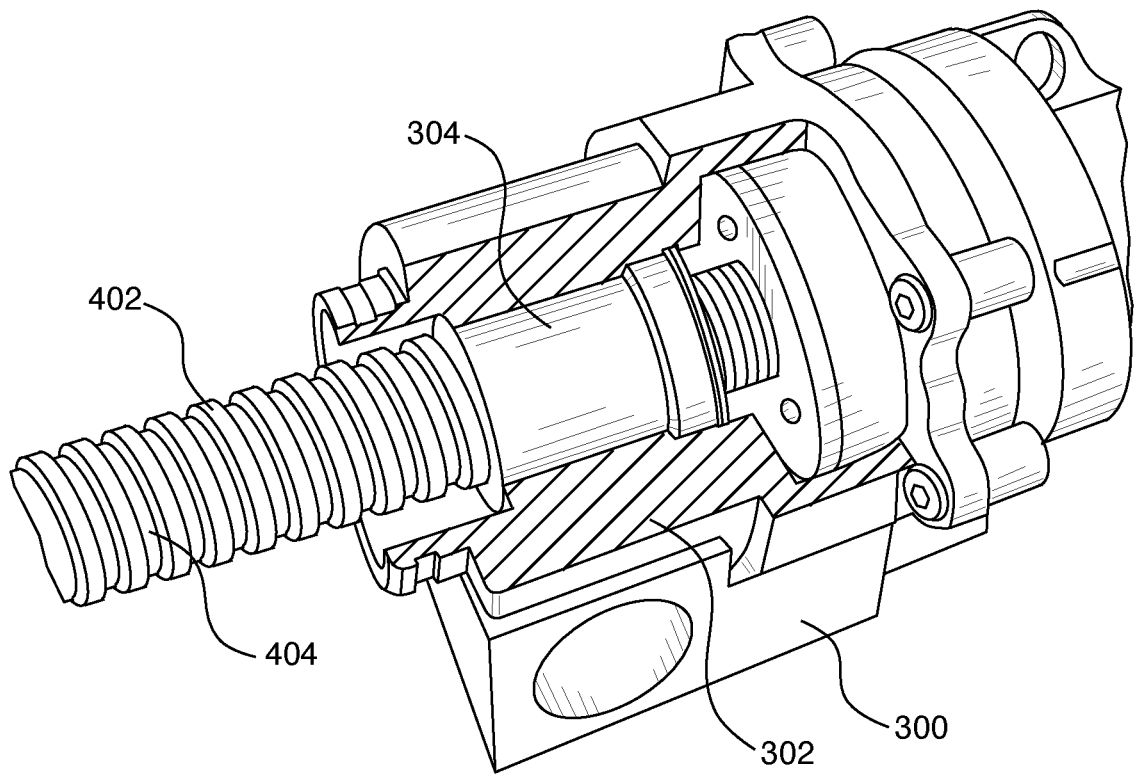
FIG. 18 illustrates the engagement between a steering rack and a passenger side housing assembly for modifying the passenger's side of the rack and pinion steering system, in accordance with one embodiment of the present invention.

FIG. 18 illustrates the engagement between the passenger side housing assembly 300 and the steering rack 402. The steering rack 402 includes a ball screw 404. The ball screw portion of the steering rack passes through the bushing 304. The tight tolerance between the bushing 304 and the steering rack 402 and between the bushing 304 and the main housing 302 provides increased support for the steering rack 402 and prevents the components from breaking.

Figure 19:
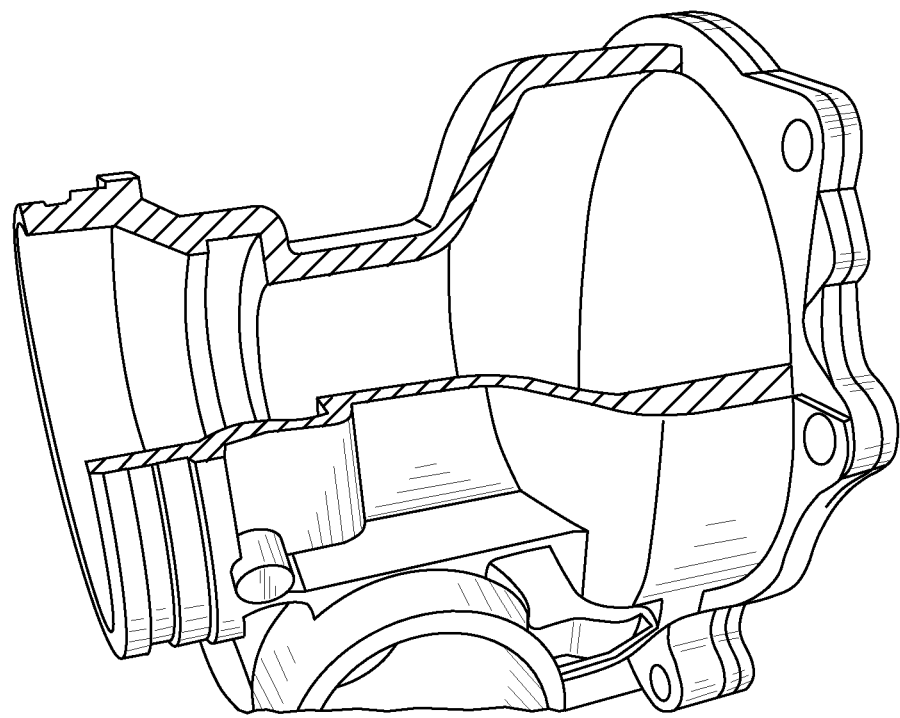
FIG. 19 is a partial cut-away view of a conventional passenger's side housing

FIG. 19 illustrates the original passenger side housing. With this original housing, there is a gap between the steering rack and the housing. As such, the original housing does not provide much, if any, support for the steering rack. This original housing is subject to breaking and cracking due to the forces that are applied with a modified steering assembly.

Figure 20:
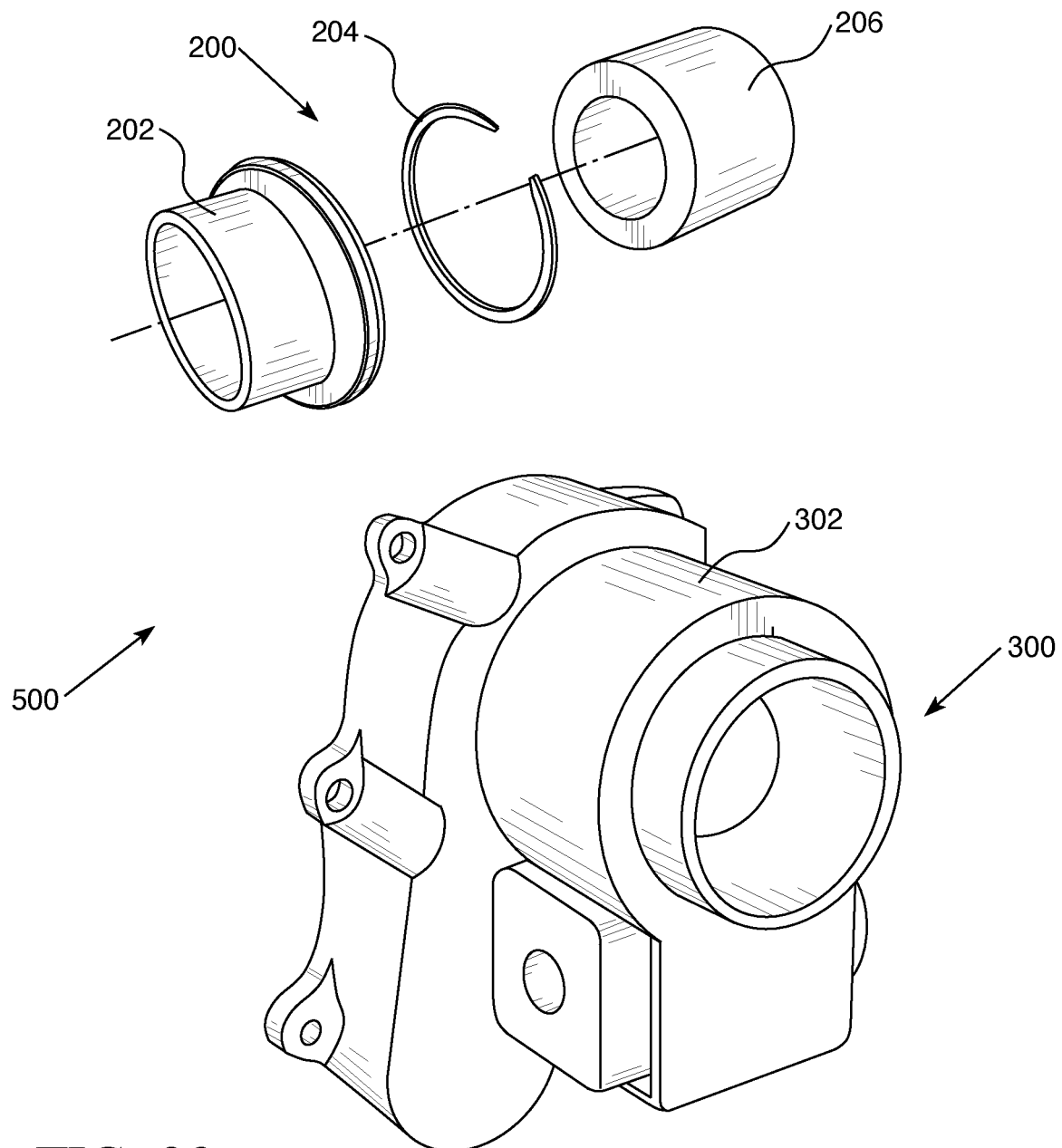
FIG. 20 illustrates a kit of parts for modifying the passenger side and the driver's side of a steering rack, in accordance with one embodiment of the present invention.

All of the parts discussed above may be provided together in a kit 500, illustrated in FIG. 20. The kit 500 is for reinforcing the steering system of a vehicle. The kit 500 includes all of the parts from the driver's side kit 200 and the passenger side housing assembly 300. In particular, the kit 500 includes the driver's side bushing 202, driver's side retainer 204, installation tool 206, passenger side main housing 302, passenger side bushing 304 (not shown in FIG. 20), and passenger side retainer 306 (also not shown in FIG. 20).

ADDITIONAL CONSIDERATIONS

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A bushing for reinforcing a rack and pinion steering system comprising a steering rack disposed within a rack housing, the bushing comprising:
   a body comprising:
      a longitudinal axis;
      a reinforcing side having an irregular cross-sectional shape that substantially occupies a space between a portion of a length of the steering rack and the rack housing without impeding axial movement of the steering rack through the rack housing, the reinforcing side located along an inner portion of the longitudinal axis; and
      a retaining side that restricts movement of the body through the rack housing, the retaining side located along an outer portion of the longitudinal axis; and
   an aperture extending along the longitudinal axis of the body and having a shape that receives the portion of the length of the steering rack without impeding the axial movement of the steering rack through the rack housing,
      wherein the irregular cross-sectional shape of the reinforcing side comprises a protruding lobe that extends around a portion of an outer circumference of the reinforcing side.

2. The bushing of claim 1, wherein the reinforcing side and the retaining side of the body are located immediately adjacent to each other.

3. The bushing of claim 2, wherein the reinforcing side and the retaining side of the body comprise integral elements of the body.

4. The bushing of claim 2, wherein a crosswise dimension of the retaining side of the body, taken perpendicular to and through the longitudinal axis of the body exceeds a crosswise dimension of the reinforcing side of the body, taken perpendicular to and through the longitudinal axis of the body.

5. The bushing of claim 4, wherein the retaining side of the body is cylindrical in shape.

6. The bushing of claim 1, wherein a length of the reinforcing side of the body, taken along the longitudinal axis of the body, exceeds a length of the retaining side of the body, taken along the longitudinal axis of the body.

7. The bushing of claim 1, further comprising an O-ring carried by an outer periphery of the retaining side of the body to seal the outer periphery of the retaining side of the body against corresponding portions of an interior of the rack housing.

8. The bushing of claim 7, comprising a groove in the outer periphery of the retaining side of the body, the groove receiving the O-ring.

9. An assembly for reinforcing a rack and pinion steering system, wherein the rack and pinion steering system comprising a steering rack disposed within a rack housing, the assembly comprising:
a bushing including:
a body including:
a longitudinal axis;
a reinforcing side having an irregular cross-sectional shape that substantially occupies a space between a portion of a length of the steering rack and the rack housing without impeding axial movement of the steering rack through the rack housing, the reinforcing side located along an inside portion of the longitudinal axis, wherein the irregular cross-sectional shape of the reinforcing side comprises a protruding lobe that extends around a portion of an outer circumference of the reinforcing side; and
a retaining side that restricts movement of the body through the rack housing, the retaining side located along an outside portion of the longitudinal axis; and
an aperture extending along the longitudinal axis of the body and having a shape that receives the portion of the length of the steering rack without impeding the axial movement of the steering rack through the rack housing; and
a retainer that further restricts movement of the body of the bushing through the rack housing.

10. The system of claim 9, wherein the retainer is positionable adjacent a wheel-side surface of the retaining side of the body, on an opposite side of the retaining side from the reinforcing side of the body.

11. The system of claim 10, wherein the retainer is positionable against the wheel-side surface of the retaining side of the body.

12. The system of claim 9, wherein the retainer comprises a snap ring that engages a groove recessed in an inside surface of the rack housing.

13. A method for reinforcing a rack and pinion steering system that comprises a steering rack disposed within a rack housing, the method comprising:
accessing an end of the rack housing;
providing a bushing that comprises a reinforcing side having an irregular cross-sectional shape, wherein the irregular cross-sectional shape comprises a protruding lobe that extends around a portion of an outer circumference of the reinforcing side;
inserting the bushing into the end of the rack housing and over an end of the steering rack; and
advancing the bushing into the rack housing and over the steering rack by aligning the protruding lobe of the reinforcing side with a lobed portion of a space between a portion of a length of the steering rack and a corresponding portion of a length of the rack housing, until a retaining portion of the bushing prevents further movement of the bushing into the rack housing and over the steering rack.

14. The method of claim 13, wherein advancing the bushing comprises advancing the bushing into the rack housing and over the steering rack until a retaining side of the bushing abuts a circumferential ledge within the rack housing.

15. The method of claim 13, further comprising after advancing the bushing, preventing further movement of the bushing along the length of the rack housing.

16. The method of claim 15, wherein preventing further movement of the bushing along the length of the rack housing comprises introducing a retainer onto the steering rack, into an interior of the housing, and against the bushing.

17. The method of claim 16, wherein introducing the retainer comprises introducing a snap ring onto the steering rack, into the interior of the housing, and against the bushing, the snap ring engaging a groove recessed in the interior of the housing.

18. The bushing of claim 1, wherein the aperture comprises an inner diameter that is constant and is approximately equal to an outer diameter of the steering rack.

19. The assembly of claim 9, wherein the aperture comprises an inner diameter that is constant and is approximately equal to an outer diameter of the steering rack.

* * * * *